(12) United States Patent
Dyson et al.

(10) Patent No.: US 6,261,330 B1
(45) Date of Patent: Jul. 17, 2001

(54) APPARATUS FOR SEPARATING PARTICLES FROM A FLUID FLOW

(75) Inventors: James Dyson, Wiltshire; Geoffrey Michael Burlington, Gloucestershire, both of (GB)

(73) Assignee: Notetry Limited, Wiltshire (GB)

( * ) Notice: Subject to any disclaimer, the term of this patent is extended or adjusted under 35 U.S.C. 154(b) by 0 days.

(21) Appl. No.: 09/319,139

(22) PCT Filed: Nov. 27, 1997

(86) PCT No.: PCT/GB97/03244

§ 371 Date: Aug. 23, 1999

§ 102(e) Date: Aug. 23, 1999

(87) PCT Pub. No.: WO98/23381

PCT Pub. Date: Jun. 4, 1998

(30) Foreign Application Priority Data

Nov. 29, 1996 (GB) .................................................. 9624847

(51) Int. Cl.[7] ............................ B01D 45/14; B01D 29/56
(52) U.S. Cl. .................. 55/345; 55/449; 55/438; 55/DIG. 3
(58) Field of Search .............................. 55/437, 438, 467, 55/449, 448, 447, 345, DIG. 3; 15/347, 352

(56) References Cited

U.S. PATENT DOCUMENTS

| 460,152 | * | 9/1891 | Morse | ..................................... | 55/438 |
| 2,787,374 | * | 4/1957 | Krebs | ..................................... | 209/210 |
| 4,107,033 | * | 8/1978 | Holz | ..................................... | 209/17 |

FOREIGN PATENT DOCUMENTS

| 1077243 | 11/1954 | (FR) . |
| 2344670 | 10/1977 | (FR) . |
| 267580 | 11/1925 | (GB) . |
| 938999 | 10/1961 | (GB) . |
| 1094098 | 12/1964 | (GB) . |
| 1253952 | 11/1971 | (GB) . |
| 1255259 | 3/1972 | (GB) . |
| 1549535 | 8/1979 | (GB) . |
| 60-31533 | * 7/1985 | (JP) ..................................... 55/438 |
| 9510972 | 4/1995 | (WO) . |

OTHER PUBLICATIONS

"Cyclocentrifuge for Coal–Conversion Gas" Energygram, XP–002056347 based on NTIS Reports.

* cited by examiner

*Primary Examiner*—David A. Simmons
*Assistant Examiner*—Robert A. Hopkins
(74) *Attorney, Agent, or Firm*—Morrison & Foerster, LLP

(57) ABSTRACT

The invention provides apparatus for separating particles from a fluid flow having a cyclonic separator (10) and a fan (12) for causing the fluid to flow through the cyclonic separator (10), the cyclonic separator (10) having an inlet (16) and an interior wall having a frusto-conical portion (18) tapering away from the inlet (16), wherein the fan (12) is positioned in the inlet (16) to the cyclonic separator (10) such that fluid passing through the fan (12) is accelerated towards the interior wall (18) and thereby given sufficient tangential velocity to cause cyclonic separation of particles from the fluid flow within the cyclonic separator (10).

17 Claims, 3 Drawing Sheets

APPARATUS FOR SEPARATING PARTICLES FROM A FLUID FLOW

The invention relates to apparatus for separating particles from a fluid flow, particularly but not exclusively to apparatus incorporating a cyclonic separator for separating dirt and dust particles from an airflow.

Cyclonic separators for separating particles from a fluid flow are well known. Within the last 15 years, many developments have been made in relation to the use of cyclonic separators within vacuum cleaners. Examples of such developments are EP 0018197, EP 0134654, EP 0489565 and EP 0636338. Inevitably there is always a desire to make cyclonic separators more efficient; that is to say, to produce a cyclonic separator which will separate a higher proportion of particles of a given diameter than comparable cyclonic separators. Constraints of size, cost and materials mean that the basic characteristics of cyclonic separators specifically intended for use in vacuum cleaners cannot be varied outside particular limits. Therefore, other ways of improving the cyclonic separator's efficiency have to be explored.

Basic cyclone theory states that there are two opposing forces acting radially on a particle travelling within a fluid flow. A centrifugal force $F_z$ acts radially outwards on the particles, pressing them towards the cyclone wall, given by $$F_z = (\rho_p - \rho)V_{t,p}^2 \frac{\pi x^3}{6r}$$

where
$\rho_p$=particle density, kg.m$^{-3}$
$\rho$=fluid density, kg.m$^{-3}$
$V_{t,p}$=tangential velocity of particle, m/s
x=particle diameter, m
r=radius of particle orbit, m However an opposing drag force $F_w$ acts towards the centre of the cyclone given by $$F_w = C_D \rho \frac{\pi x^2}{8}(V_r - V_{r,p})$$

where
$V_r$=radial velocity of fluid, m/s
$V_{r,p}$=radial velocity of particle, m/s
$C_D$=drag coefficient (drag force per unit projected particle area/dynamic pressure)

When $F_z$ exceeds $F_w$, the particle is thrown against the cyclone wall and separated from the air flow. When $F_w$ exceeds $F_z$, the particle remains entrained within the air flow and exits the cyclone separator with it. Clearly it is highly advantageous to give $F_z$ as large a value as possible. Since $F_z$ is proportional to the square of the particle's tangential velocity, increasing the tangential velocity of the fluid will increase the cyclone's efficiency.

A parameter which is important in cyclonic separator theory is the cut diameter or cut point. This is the diameter of particle of which, for specified fluid flow conditions, 50% are removed by the cyclone and 50% remain entrained. The cut point is a measure of the separation efficiency of the cyclone: the lower the cut point for given conditions, the lower the proportion of particles remaining in the fluid flow; therefore, the higher the separation efficiency. It is therefore desirable to achieve as low a cut point as possible for specified conditions.

Semi-empirical cyclone theory has been developed to give an expression for the cut size $X_{50}$ for which 50% of the particles are collected.

$$X_{50} = \sqrt{\frac{kQ\mu}{\rho_p V_t^2}}$$

where
Q=volumetric flow rate, m$^3$/s
$\mu$=viscosity, kg/ms
k=geometric factor
$V_t$=tangential velocity, m/s The theory states that $V_t$ in the cyclone vortex is a linear function of Q. This suggests that the cut size can be decreased by increasing $V_t$ (i.e. $X_{50} \sqrt{(1/V_t)}$) and hence increasing the separation efficiency.

The computation of the separation efficiency for a range of particle sizes (commonly known as the grade efficiency curve) also depends on the cyclone parameters and flow characteristics of the fluid. The separation efficiency can be expressed empirically, for any particle size, as:

$$\xi = \left[1 + \left(\frac{kV_t^2 \rho_p x^2}{\mu Q}\right)^{-3.2}\right]^{-1}$$

This also suggests that, for any fixed cyclone design and particle size, the separation efficiency is governed by the tangential velocity and the volumetric flow rate, the latter of which is related to the former. Hence, again, the separation efficiency will increase as the tangential velocity increases.

All of the above theory indicates that the efficiency of a cyclone can be increased by increasing the tangential velocity. The simplest way to achieve such an increase is merely to provide a more powerful motor to create a higher rate of fluid flow. Unfortunately, there are limits to the type of motor which can be utilized in some applications such as, for example, domestic vacuum cleaners. Such motors are limited by factors such as physical size, weight and cost. For this type of application other ways of increasing the tangential velocity of the fluid flow at the inlet to the cyclone must be sought.

It has long been recognised that fluid leaving a fan which incorporates rotating impeller blades has a tangential velocity component. Until now, only limited effective use has been made of that tangential component in cyclonic separators. The fan has normally been located at a position remote from the cyclone inlet, normally downstream of the separator, so that all of the tangential velocity of the fluid entering the cyclone has to be forcibly applied to the fluid flow upstream of the cyclone. The forced application of a tangential velocity component inevitably causes slight decreases in the flow rate overall due to friction losses.

There have been some attempts to utilise the tangential component of the velocity of the fluid leaving a fan in some cyclonic separators used to separate solids (or semi-solids) from liquids. Examples of such separators are shown and described in GB 727137 and FR 1077243. In each of these separators, a fan is located in the upper end of the cyclonic separator and arranged so that the tips of the blades run very close to the cyclone wall. This allows the fan to be responsible for setting up swirling cyclonic motion in the fluid entering the cyclone and the need for a tangential inlet is avoided. However, when an outlet of the separator is to be provided at the same end of the cyclone as the inlet, the arrangement is that a vortex finder is located so that it passes through the fan itself (see, for example, FIG. 1 of GB 727137). This means that the incoming fluid cannot be passed directly to the eye of the fan and this will lead to limitations on the maximum speed of the fan and a consequential loss in performance of the fan.

It is therefore an object of the invention to provide apparatus for separating particles from a fluid flow having a cyclonic separator which, for given conditions, has a higher inlet tangential velocity and therefore a higher separation efficiency than corresponding known separators and overcomes the problems of the prior art. It is a further object of the invention to provide apparatus for separating particles from a fluid flow having a cyclonic separator which makes advantageous use of the tangential velocity component of fluid leaving a fan. A further object of the invention is to provide apparatus for separating particles from a fluid flow having a cyclonic separator which is efficient, compact, lightweight and easy to service and maintain.

The invention provides apparatus as set out in claim 1. The location of the fan in the inlet to the cyclonic separator means that relatively high inlet tangential velocities can be achieved within the cyclone due to lower losses, hence improving the efficiency of the cyclone. This maximises the utilisation of the tangential velocity imparted to the fluid flow by the fan. Also, the arrangement of interleaved inlet and outlet conduits avoids the need to pass the vortex finder through the fan which optimises the fan's performance. Further advantageous features are set out in the subsidiary claims. It will be noted that, contrary to the arrangement in many known cyclonic vacuum cleaners, the fluid flow is in this case pushed through the cyclone separator instead of being pulled or sucked.

Embodiments of the invention will now be described with reference to the accompanying drawings, wherein.

Figure 1:
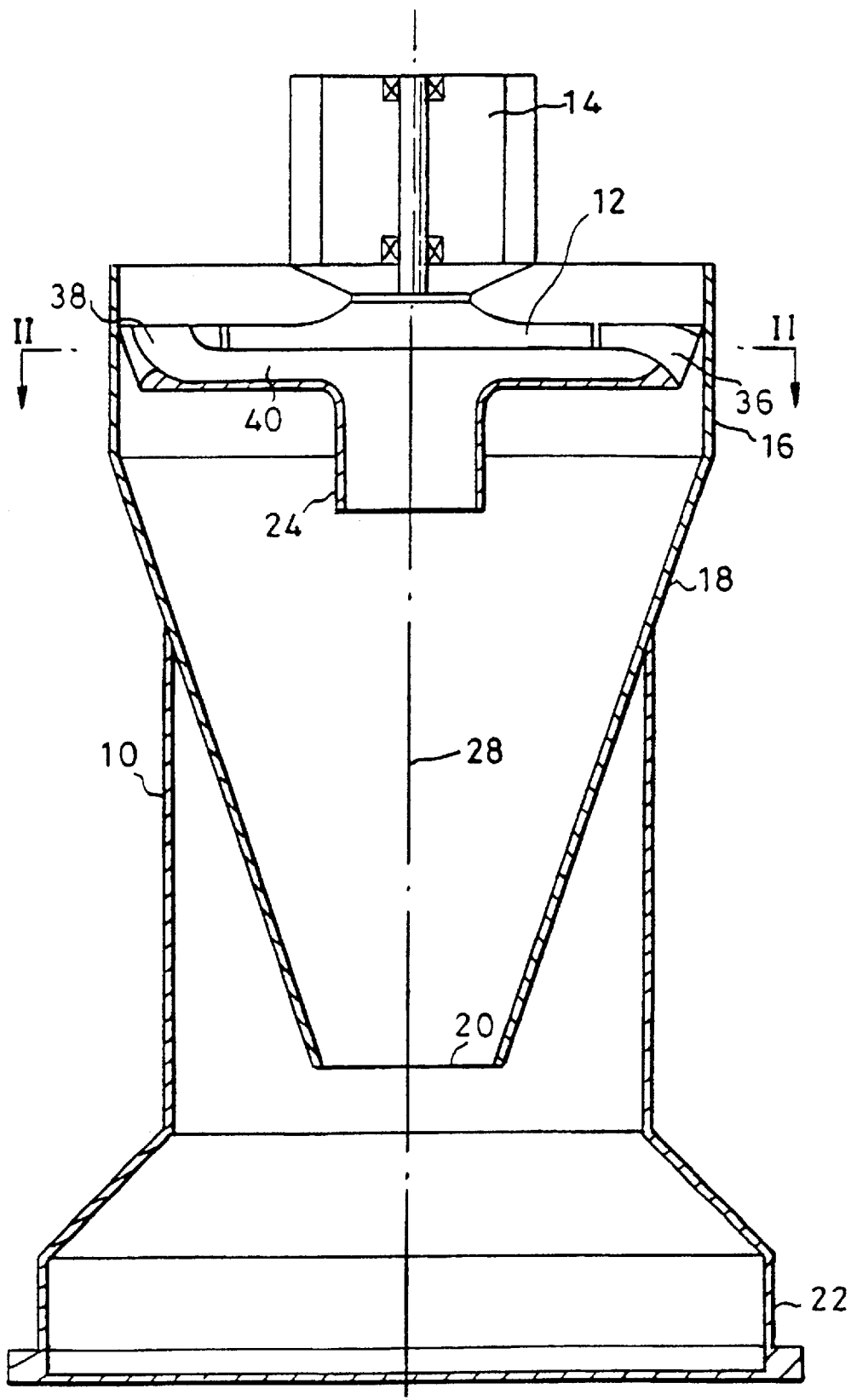
FIG. 1 is a schematic longitudinal sectional view of a cyclonic separator and fan according to a first embodiment of the invention.
Figure 2:
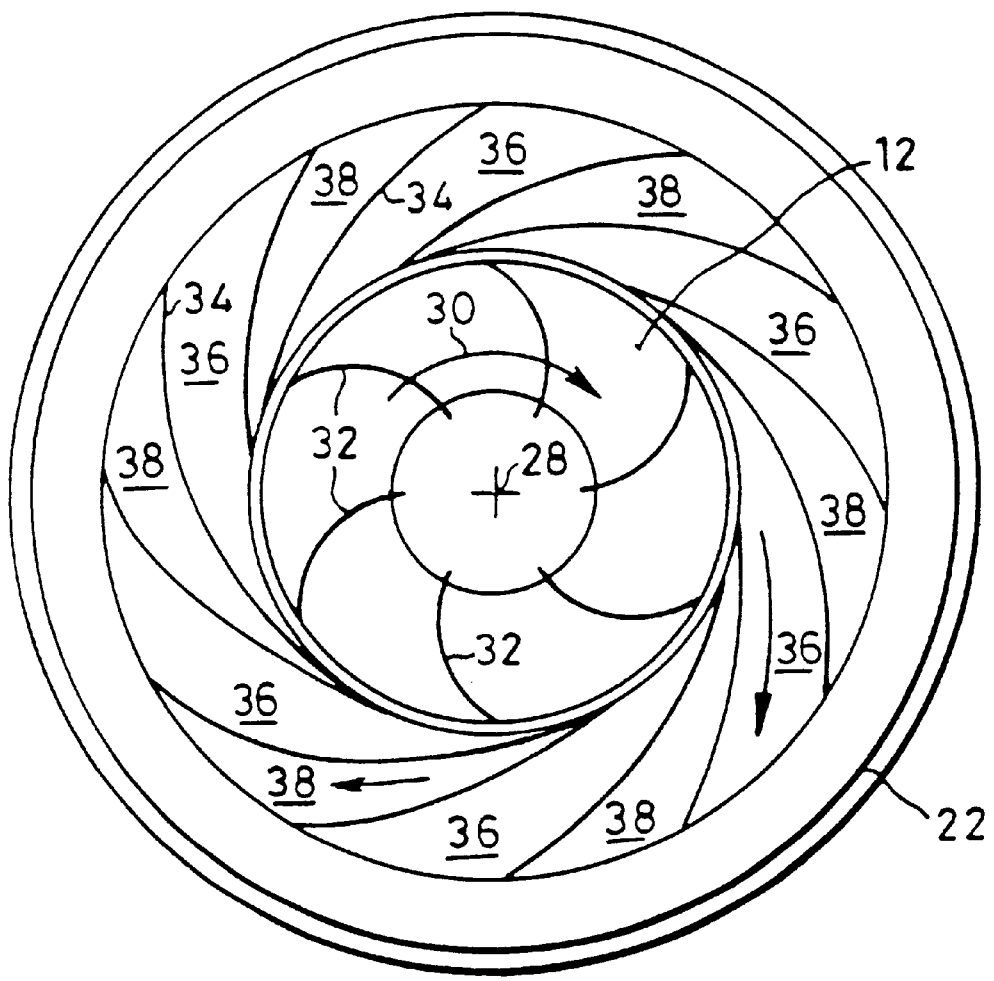
FIG. 2 is a cross section taken on line II—II of FIG. 1.

The apparatus shown in FIGS. 1 and 2 consists of a cyclonic separator 10, a fan 12 and a motor 14. The cyclonic separator 10, which in this embodiment forms part of a vacuum cleaner, is essentially of standard construction comprising an upper cylindrical wall 16 located at the upper edge of a conical tapering cyclone wall 18 which leads to a cone opening 20. Sealingly attached to the outer surface of the cyclone wall 18 and surrounding the cone opening 20 is a collecting chamber 22 which has an outer diameter of at least three times that of the cone opening 20. The collecting chamber 22 is removable to allow dirt and dust collected therein to be disposed of. An exit port 24 is provided at the upper end of the cyclonic separator 10, coaxial with the longitudinal axis 28 of the cyclone wall 18 and collecting chamber 22, and communicating with the downstream path (not shown) of the fluid from which particles are to be separated.

A conventional cyclonic separator would have an inlet port consisting of an entry conduit arranged to introduce an airflow into the cyclonic separator 10 tangentially to the upper cylindrical wall 16 under the influence of a motor and fan arranged downstream of the cyclonic separator. This type of arrangement can be seen in the prior art documents mentioned above. The apparatus of the present invention utilises a different entry arrangement but, downstream of the inlet port, the operation of the cyclonic separator is the same. Downstream of the inlet port, the airflow moves along a spiral path down the inside of the cyclone wall 18, increasing in speed as it progresses, until it emerges through the cone opening 20 into the collecting chamber 22. Larger particles previously entrained within the airflow are flung against the outer wall of the collecting chamber 22 and collected therein. Inevitably, and in accordance with the theory outlined above, some smaller particles remain entrained and they exit the collecting chamber 22 with the airflow via the cone opening 20 and pass generally along the axis 28 to the exit port 24 and from there to the downstream airflow path.

The above arrangement and separation operation are known. The difference between the apparatus described above and the apparatus of the invention lies in the inlet port. Instead of providing a tangential entry port into the upper end of the cyclonic separator, the apparatus of the present invention provides a fan 12 positioned centrally within the inlet to the cyclonic separator 10. Indeed, in the embodiment shown, the fan 12 is located within the upper cylindrical wall 16 and is rotatable about the longitudinal axis 28 of the cyclone wall 18 (see arrow 30). The fan 23 is of standard design and has a plurality of impeller blades 32 whose rotation causes the airflow to flow through the cyclonic separator, also accelerating the airflow towards the cyclone wall 18 and imparting sufficient tangential velocity to cause cyclonic separation of dirt and dust particles from the airflow within the separator 10.

Located radially outwardly of the fan 12 is a plurality of vanes 34 which define a series of conduits 36 leading from the fan 12 to the upper cylindrical wall 16. These inlet conduits 36 guide the airflow so that it emerges adjacent the upper cylindrical wall 16 without losing its high tangential velocity. The high tangential velocity is achievable due to the fact that the tangential velocity provided to the airflow by the fan is present as the airflow reaches the upper cylindrical wall 16. Frictional losses due to the redirectioning of the fluid are minimal or relatively small. Therefore the tangential velocity of the airflow in the cyclonic separator 10 is higher than the known equivalent cyclonic separator mentioned above and the separation efficiency of the cyclone is improved. Since the losses inherent in the arrangement are smaller than those inherent in the known equivalent separator, the airflow through the separator per unit of power consumed is also improved.

In the embodiment shown, the motor 14 is located immediately adjacent the fan 12. This arrangement is simple and efficient. However, the location of the fan 12 and motor 14 above the cyclonic separator 10 and coaxially therewith means that the exit port 24 of the cyclonic separator 10 cannot take its normal route out of the cyclone along the same axis 28. The problem is solved in the illustrated embodiment by providing outlet conduits 38 between the inlet conduits 36, the outlet conduits 38 being connected to the outlet port 24 by other passageways or conduits or by an exit chamber 40 extending radially outward from the exit port 24 towards the upper cylindrical wall 16. The airflow exiting the cyclonic separator 10 can be led through convoluted passages if desired since, once separation has been completed, it is no longer necessary to maintain a high flow rate. The exiting airflow can be led past the motor 14 for cooling purposes if desired.

Figure 3:
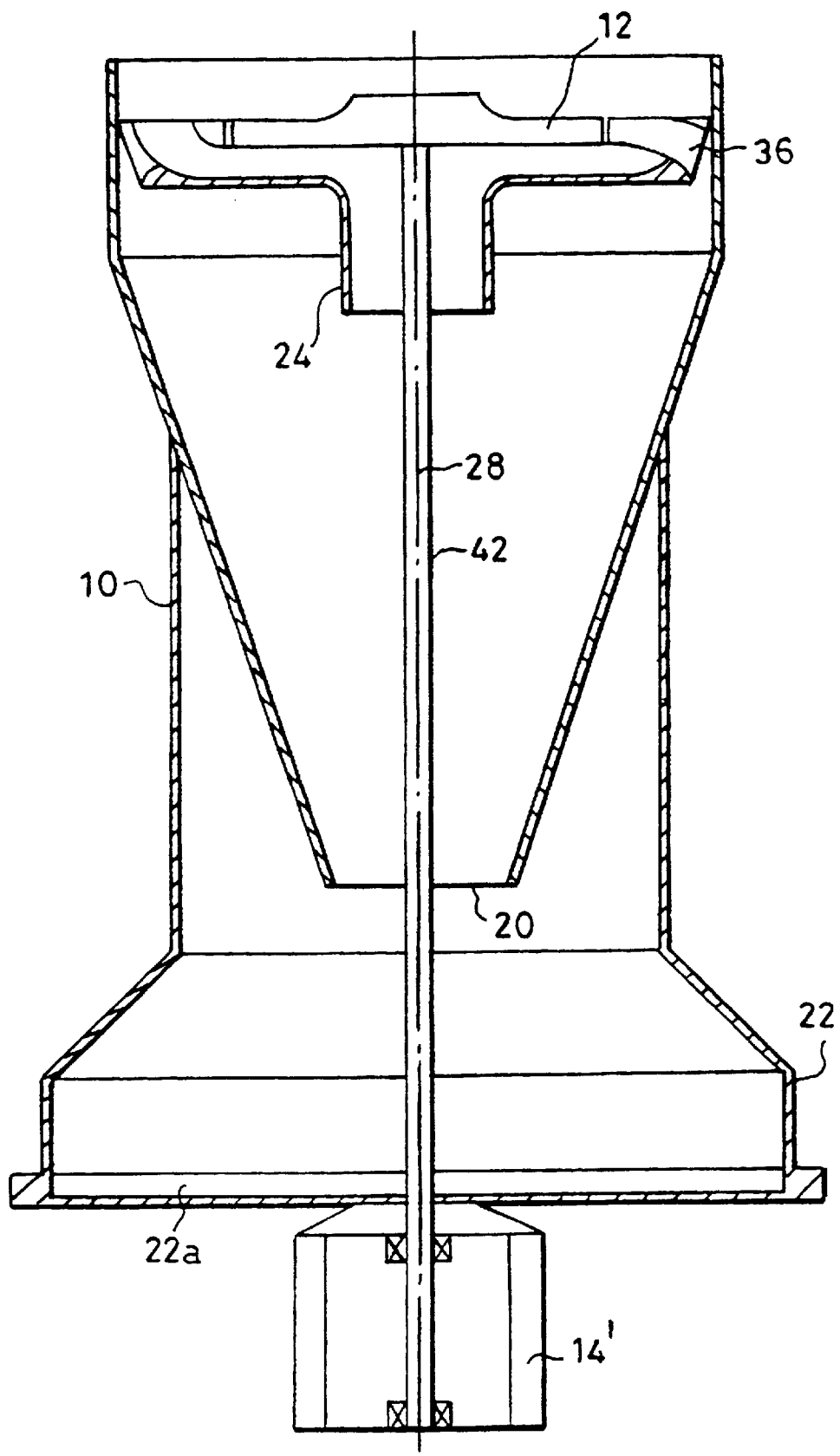
FIG. 3 is a view, similar to FIG. 1, of a second embodiment of the invention.

A second embodiment of the invention is illustrated in FIG. 3. The arrangement shown in FIG. 3 is identical to that shown in FIG. 1, with the exception of the positioning of the motor 14' which drives the fan 12. In FIG. 3, the motor 14' is positioned below the collecting chamber 22 and has a drive shaft 42 passing through the collecting chamber 22, the cyclonic separator 10 and the exit port 24, along the longitudinal axis 28 thereof. The drive shaft 42 is directly connected to the fan 12, which occupies the same position in FIG. 3 as it does in FIG. 1.

The positioning of the motor 14' below the collecting chamber 22 in the embodiment of FIG. 3 has the advantage of lowering the centre of gravity of the vacuum cleaner as a whole compared to the embodiment shown in FIG. 1. This is advantageous for stability reasons. If the motor 14' is positioned as shown in FIG. 3, the fan 12 can include passageways to allow the exiting air to pass out of the separator along the axis 28 instead of through the outlet conduits 38. This simplifies the structure and reduces manufacturing costs.

It will be appreciated that the fan, shown in the embodiments as a radial fan, can be an axial fan which would also impart tangential velocity to the airflow passing therethrough.

The invention described above is suitable for use in vacuum cleaners, particularly domestic vacuum cleaners. The repositioning of the fan to a position within the inlet to the cyclonic separator takes full advantage of the fact that the air (or other fluid) exiting the fan has a tangential velocity component and this is used to enhance the inlet tangential velocity and hence the efficiency of the cyclonic separator. In vacuum cleaners incorporating two cyclonic separators, it is preferable for the fan to be positioned immediately upstream of the second, high efficiency cyclonic separator, partly to enhance the separation of fine dust particles, but also to ensure that larger particles are removed from the airflow before passing through the fan. This will reduce wear to the fan and also reduce the risk of damage occurring during operation. The positioning of the motor directly adjacent the fan as shown in FIG. 1 provides a compact unit which can be easily accessed or removed for maintenance and/or repair. However, providing a drive shaft as shown in FIG. 3 can allow the motor to be used for other purposes within the appliance if necessary. It is envisaged that some applications of cyclonic separators may utilise two or more separators similar to the one illustrated and described above and each separator may require its own fan. Appropriate positioning of the separators would allow two or more fans to be driven directly by the same motor.

For the purposes of illustration only, the following dimensions are given as an example of a cyclonic separator of the type shown in FIG. 1 and suitable for use in a domestic vacuum cleaner:

| | |
|---|---|
| Diameter of fan 12: | 109 mm |
| Diameter of cylindrical wall 16: | 140 mm |
| Depth of cylindrical wall 16: | 45 mm |
| Depth of cyclone wall 18: | 325 mm |
| Diameter of cone opening 20: | 25 mm |
| Diameter of collecting chamber 22: | 145 mm |
| Diameter of upper part of collecting chamber: | 80 mm |
| Height of cone opening 20 above base: | 70 mm |
| Diameter of exit port 24: | 32 mm |

It must be emphasised that this invention is not limited to separators for separating particles from an airflow or for use with a vacuum cleaner. The principles mentioned at the outset apply generally to most fluids and the apparatus can be used to separate particles from vehicle exhaust fumes, water other liquids and other gases. The fact that the preferred application at the time of filing is in vacuum cleaners is not intended to be limiting.

What is claimed is:

1. Apparatus for separating particles from a fluid flow comprising a cyclonic separator and a fan for causing the fluid to flow through the cyclonic separator, the cyclonic separator having an inlet and an interior wall having a frusto-conical portion tapering away from the inlet, the fan being positioned in the inlet to the cyclonic separator such that fluid passing through the fan is accelerated towards the interior wall and thereby given sufficient tangential velocity to cause cyclonic separation of particles from the fluid flow within the cyclonic separator, wherein a plurality of vanes defining a series of inlet conduits are provided between the fan and the interior wall of the cyclonic separator, and an exit port through which the fluid from which particles have been separated leaves the cyclonic separator is provided adjacent the fan, the exit port comprising a series of outlet conduits for directing the said fluid between the inlet conduits.

2. Apparatus as claimed in claim 1, wherein the vanes follow a generally spiral path when viewed along the central axis of the cyclonic separator.

3. Apparatus as claimed in claim 1 or 2, wherein the outlet conduits follow a generally spiral path when viewed along the central axis of the cyclonic separator.

4. Apparatus as claimed in claim 3, wherein the outlet conduits extend radially outwardly from the exit port towards the interior wall of the cyclonic separator.

5. Apparatus as claimed in claim 1, wherein the exit port comprises a vortex finder.

6. Apparatus as claimed in claim 1, wherein the number of inlet conduits is the same as the number of outlet conduits.

7. Apparatus as claimed in claim 6, wherein the inlet conduits and outlet conduits are arranged alternately about the central axis of the cyclonic separator.

8. Apparatus as claimed in claim 1, wherein a motor is provided for driving the fan, the motor being located adjacent the fan.

9. Apparatus as claimed in claim 8, wherein the fluid flow is arranged to cool the motor.

10. Apparatus as claimed in claim 1, wherein an upstream particle separator is provided upstream of the fan.

11. Apparatus as claimed in claim 8 or 9, wherein an upstream particle separator is located upstream of both the motor and the fan.

12. Apparatus as claimed in claim 10, wherein the upstream particle separator is a second cyclonic separator.

13. Apparatus as claimed in claim 1, wherein a motor is provided for driving the fan, the motor having a drive shaft connected to the fan and passing through the cyclonic separator along the central axis thereof.

14. Apparatus as claimed in claim 13, further comprising a second cyclonic separator and a second fan for causing the fluid to pass through the second cyclonic separator, wherein the drive shaft is connected to the second fan.

15. Apparatus as claimed in claim 1, wherein the fan is positioned centrally in the inlet to the cyclonic separator.

16. Apparatus as claimed in claim 1, wherein the interior wall comprises an upper cylindrical portion from which the frusto-conical portion tapers away, the fan being positioned within the upper cylindrical portion.

17. A vacuum cleaner having an apparatus for separating particles from a fluid flow having a cyclonic separator and a fan for causing the fluid to flow rough the cyclonic separator, the cyclonic separator having an inlet and an interior wall having a frustro-conical portion tapering away from the inlet, wherein the fan is positioned in the inlet to the cyclonic separator such that fluid passing through the fan is accelerated towards the interior wall and thereby given sufficient tangential velocity to cause cyclonie separation of particles from the fluid flow within the cyclonic separator, wherein a plurality of vanes defining a series of inlet conduits are provided between the fan and the interior wall of the cyclonic separator, and an exit port through which the fluid from which particles have been separated leaves the cyclonic separator is provided adjacent the fan, the exit port comprising a series of outlet conduits for directing the said fluid between the inlet conduits.

* * * * *